United States Patent Office 2,980,928
Patented Apr. 25, 1961

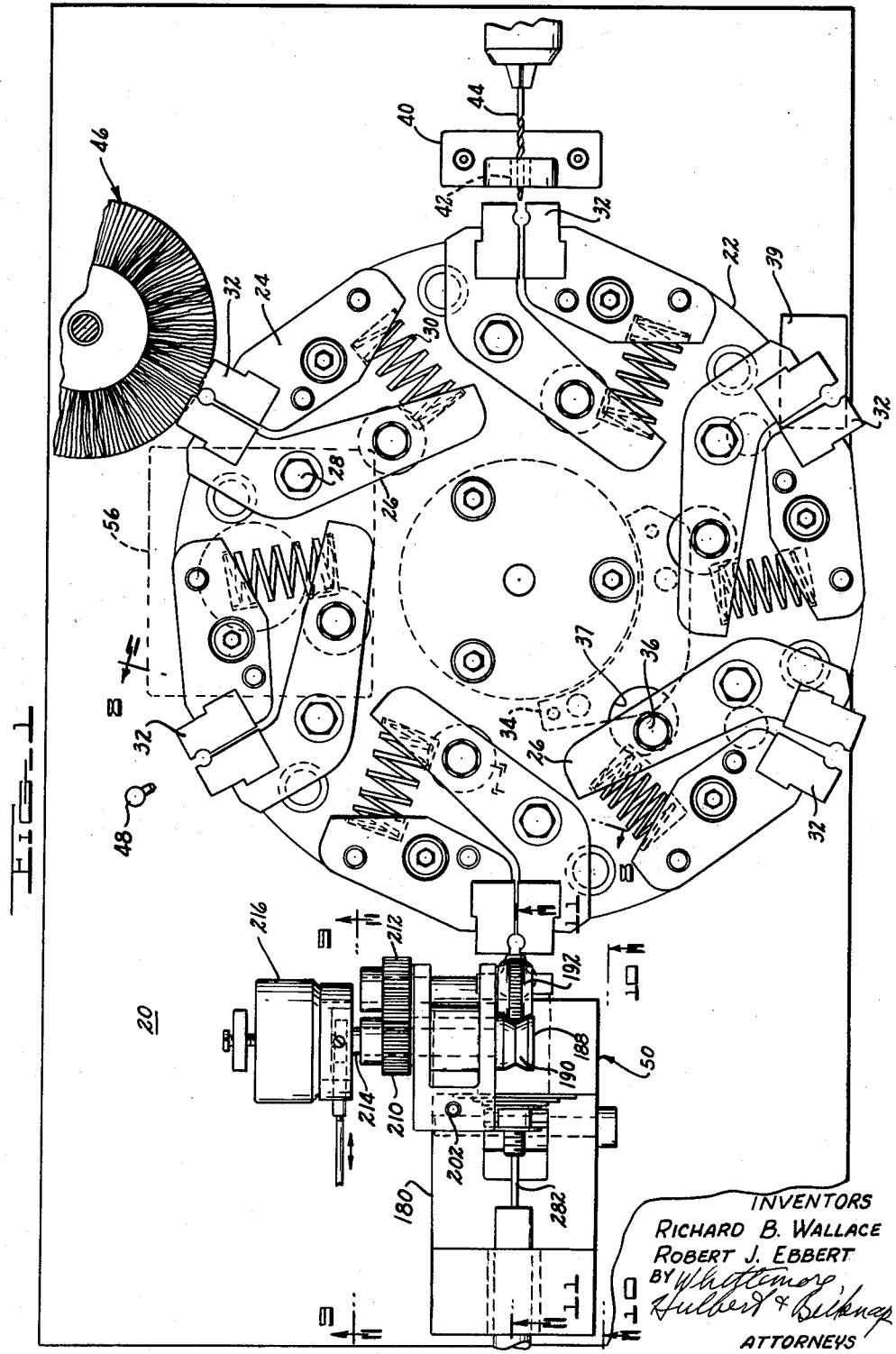

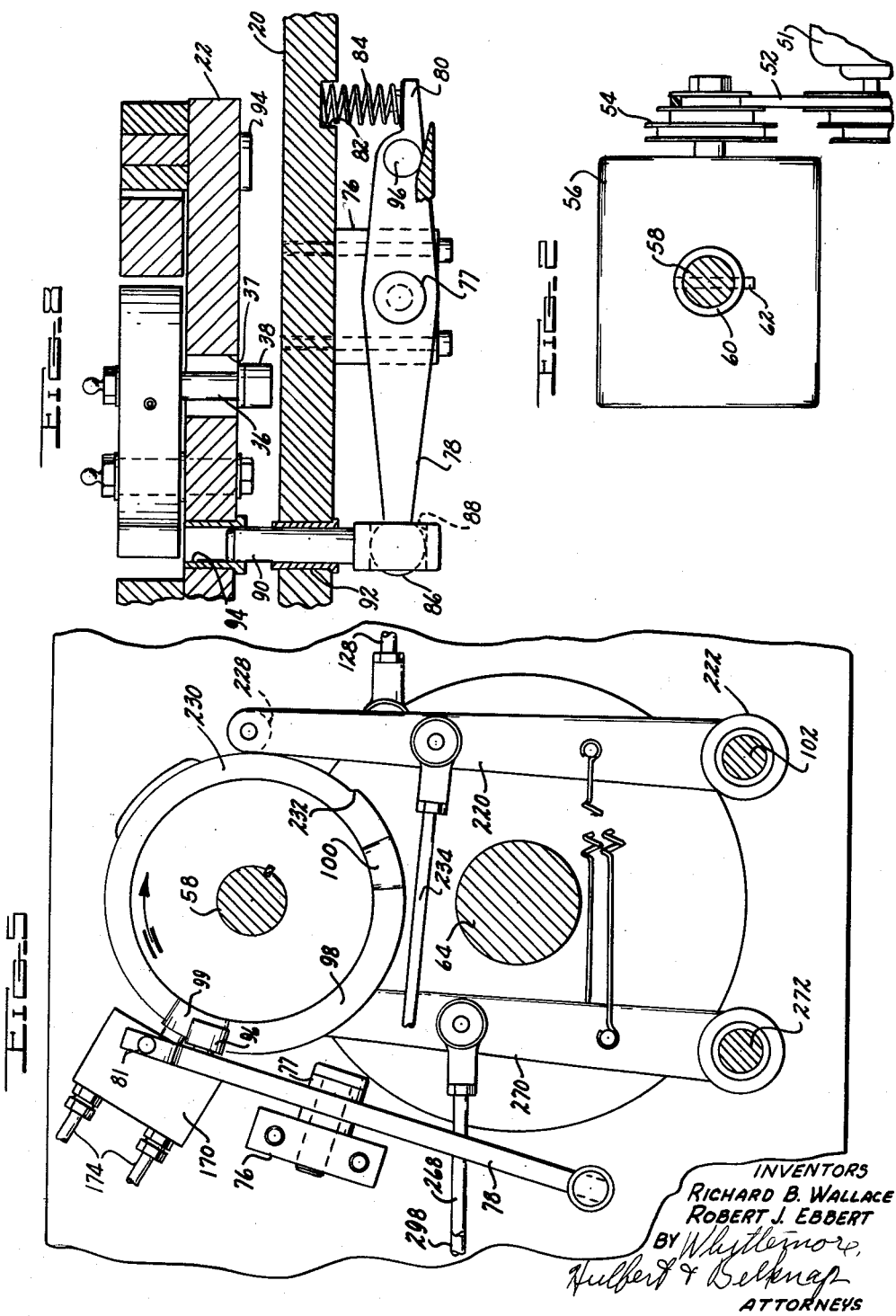

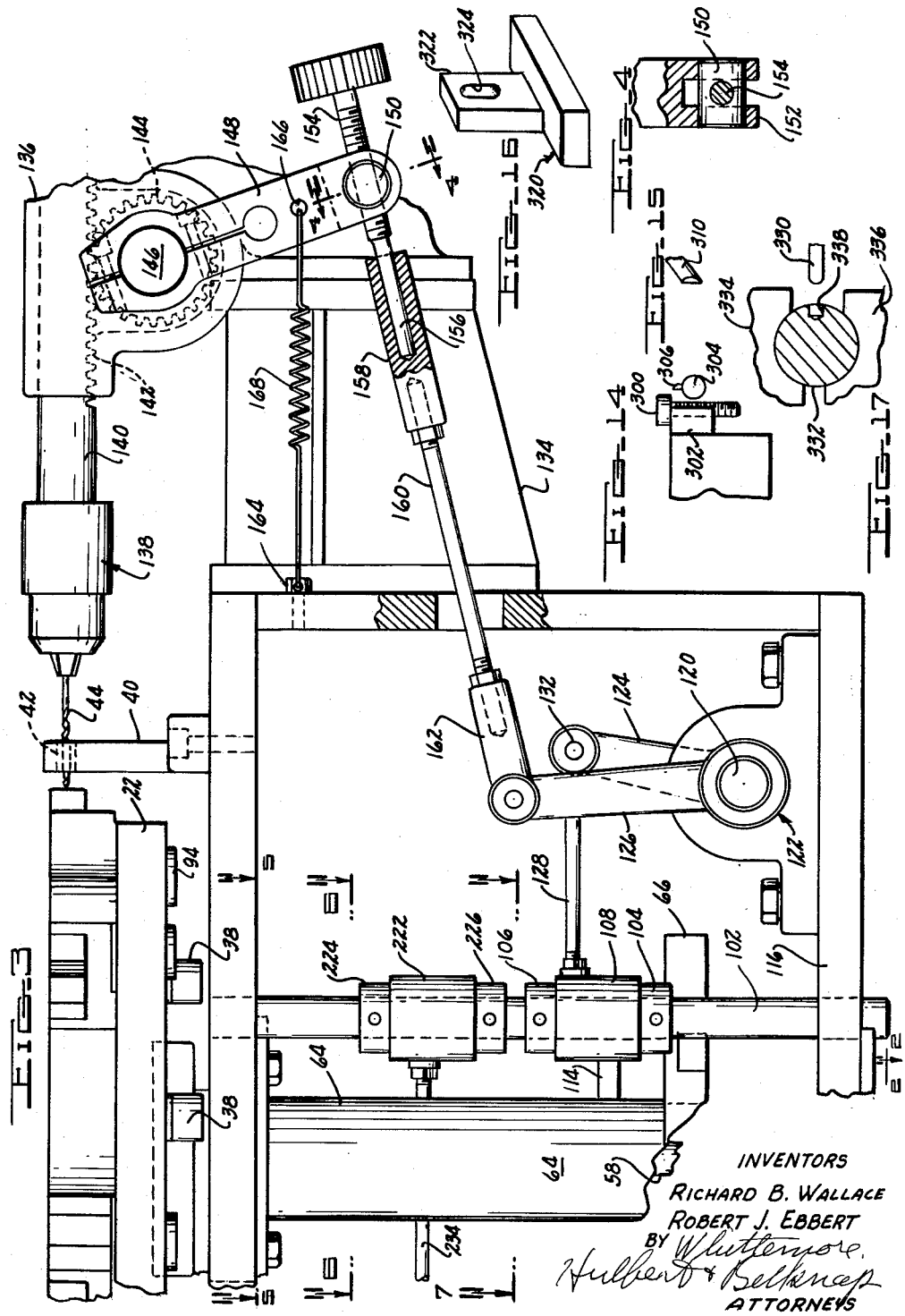

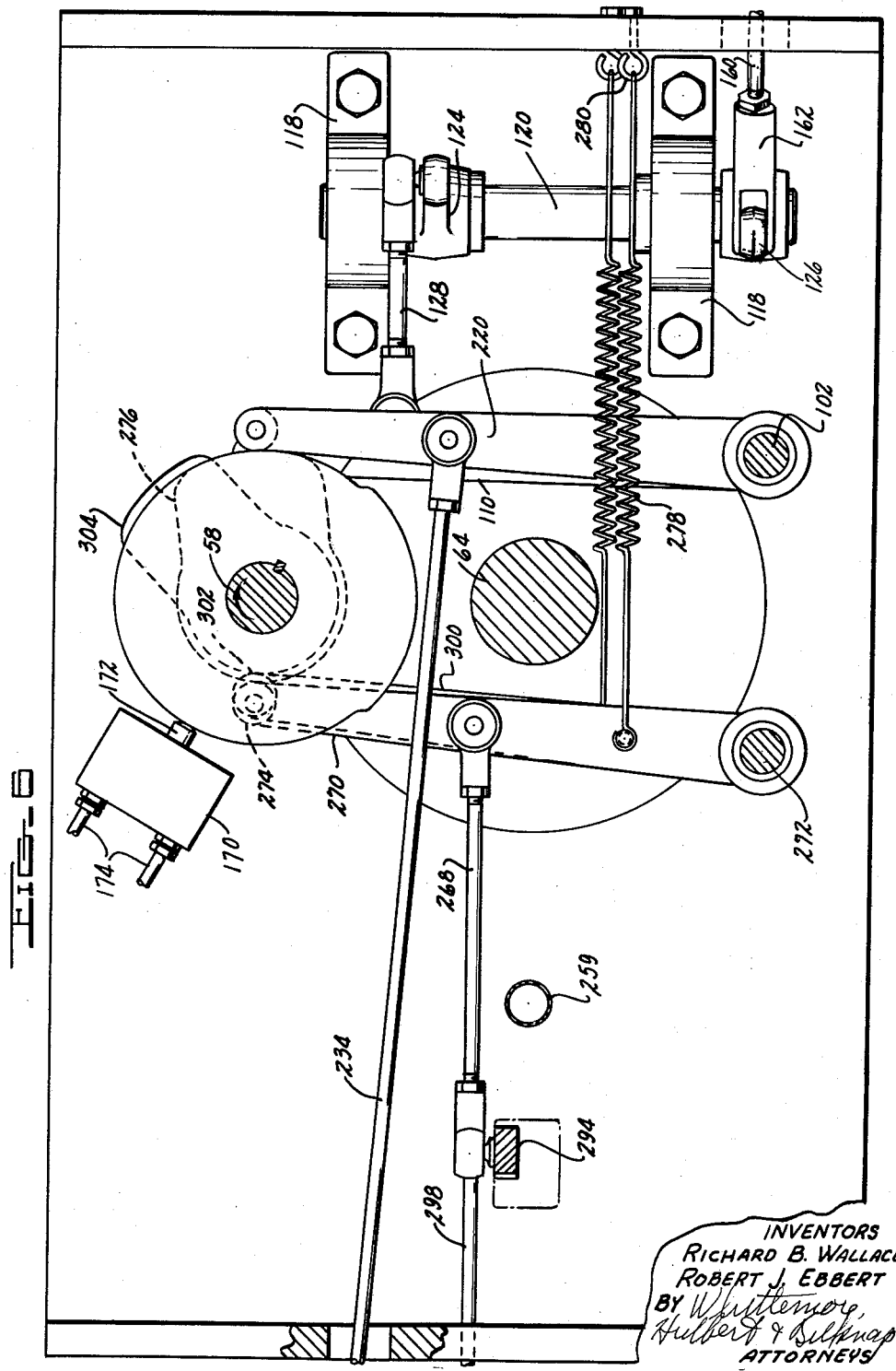

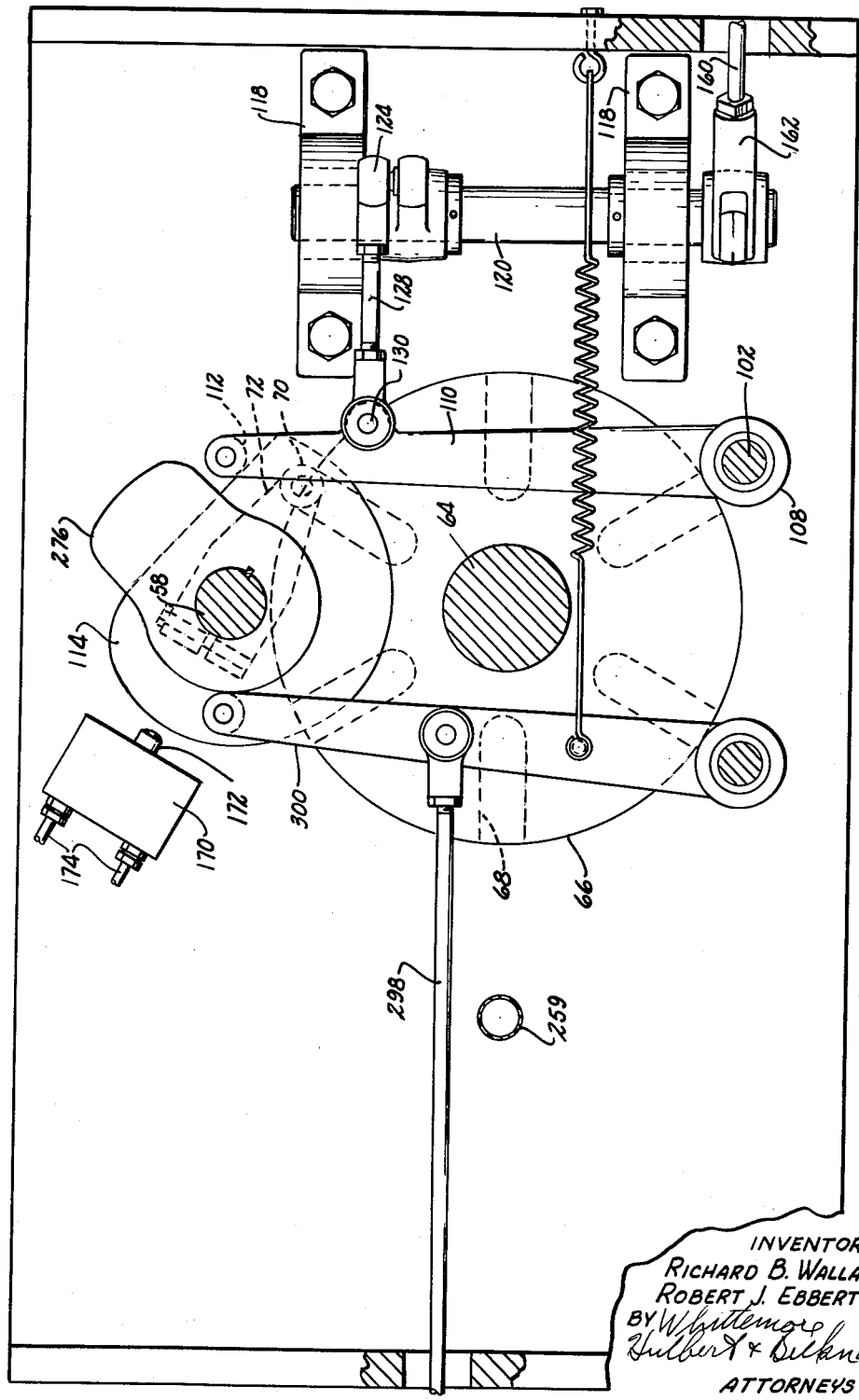

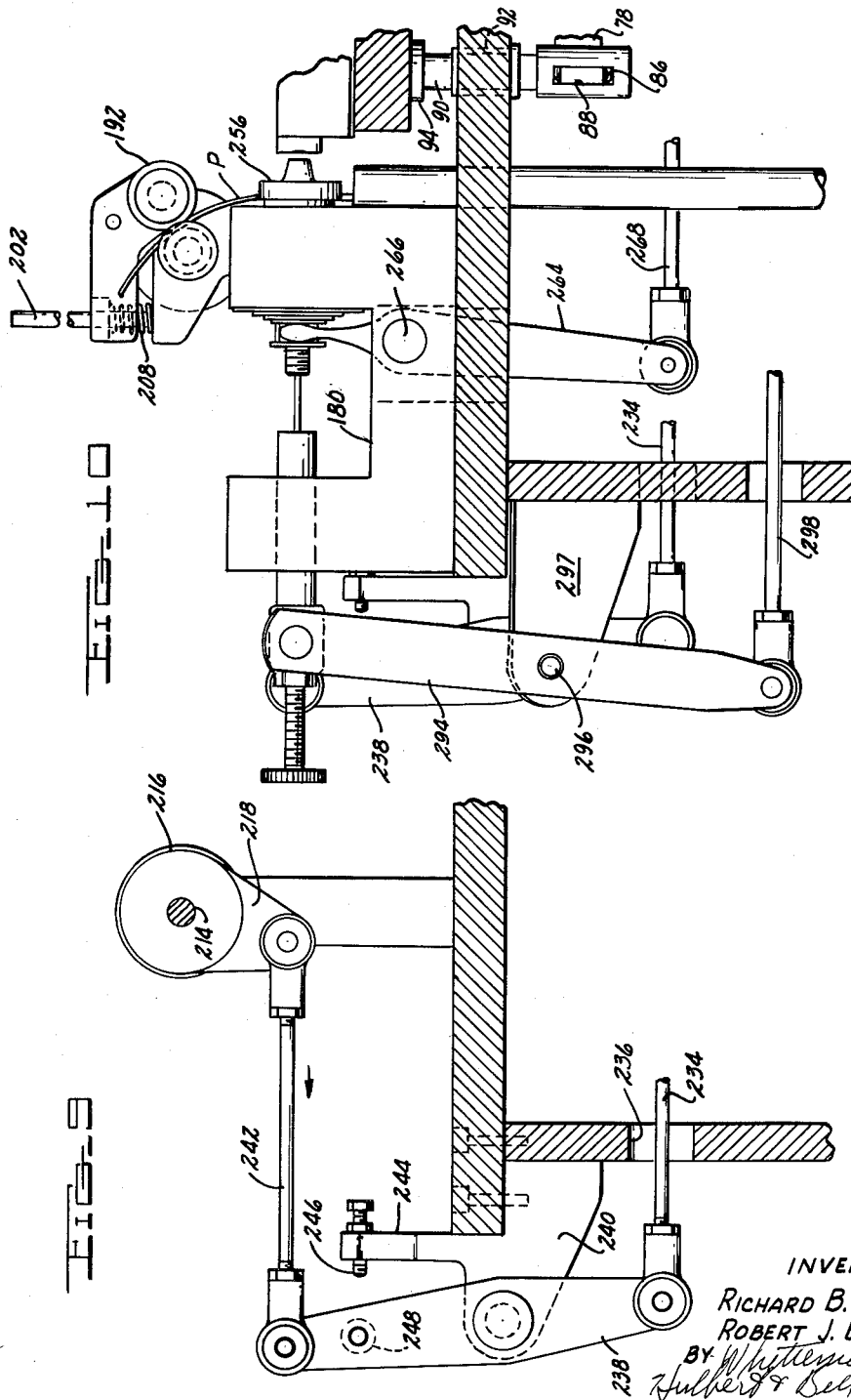

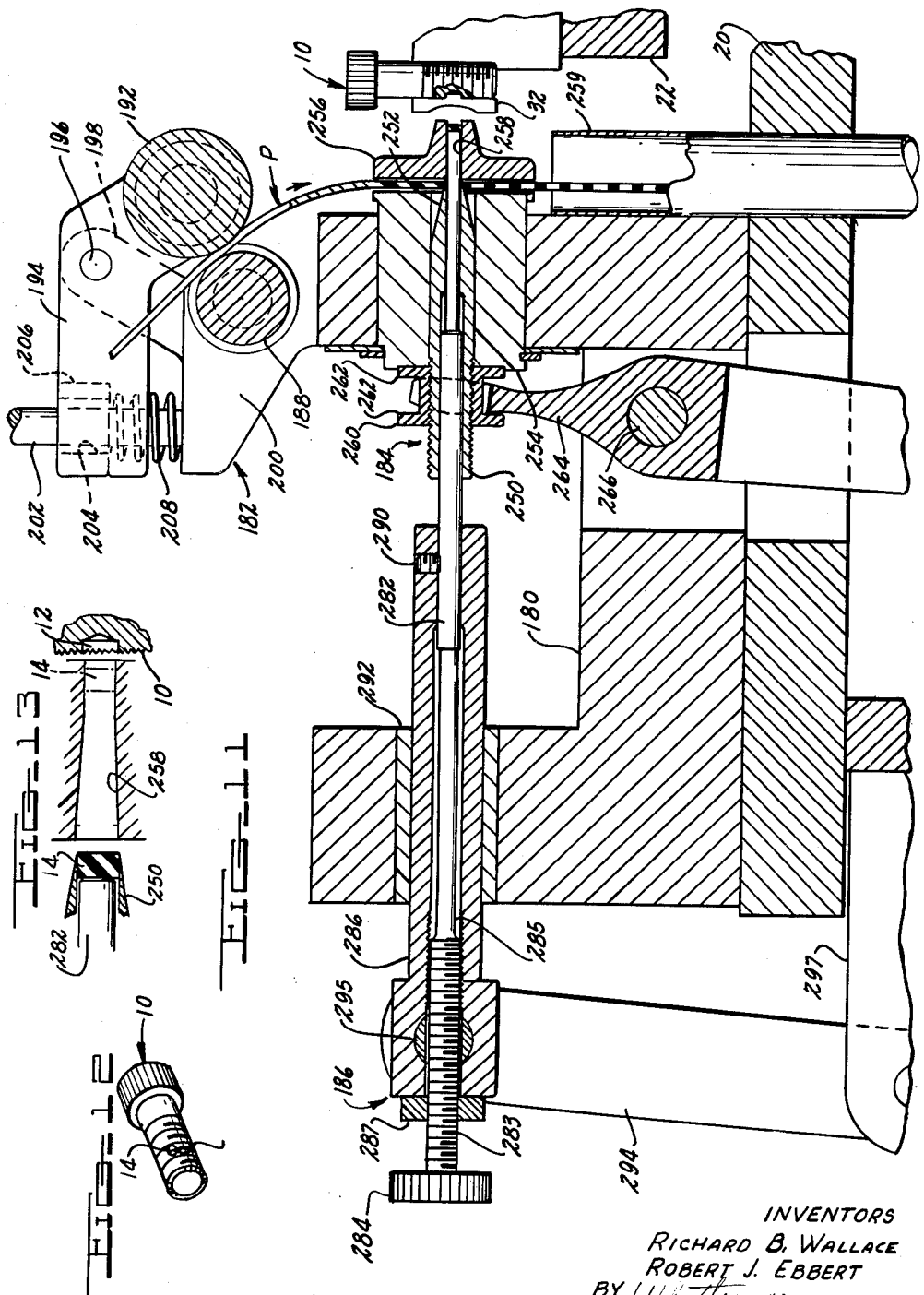

2,980,928

APPARATUS FOR APPLYING LOCKING PLUGS OF PLASTIC MATERIAL TO THREADED ARTICLES

Richard B. Wallace, Birmingham, and Robert J. Ebbert, Rochester, Mich., assignors, by direct and mesne assignments, to The Oakland Corporation, Birmingham, Mich., a corporation of Michigan Filed Aug. 27, 1956, Ser. No. 606,321

4 Claims. (Cl. 10—2)

The present invention relates to apparatus for applying locking plugs of plastic material such as nylon to threaded articles.

It is an object of the present invention to provide apparatus for drilling shallow recesses in the side of a threaded article and for cutting and applying a cylindrical plastic plug thereto in relation to form a friction lock with the threads of a counterpart member.

More specifically, it is an object of the present invention to provide apparatus operable automatically to drill a shallow recess in the side of a drilled article, to remove burrs from the drilled recess, and to cut and apply a cylindrical nylon or other plastic plug to the recess.

It is a feature of the present invention to provide an automatic machine for performing the above mentioned steps comprising a single motor drive and cam means for effecting all of the necessary motions of the several mechanisms.

More specifically, it is a feature of the present invention to provide a machine having a rotary index table provided with a plurality of work clamping members thereon, means for advancing the table in a step by step sequence, means for locking the table against rotation between each index rotation thereof, a drill guide at one side of the table, a drill slide movable radially of the table to advance a drill through the drill guide into engagement with a work piece on the table, a stationary brush support adjacent the path of advance of work pieces with the table, and a stationary mechanism adjacent the path of advance of work pieces on the table including means for advancing a plastic strip, means for cutting cylindrical discs therefrom, and punch means for setting the discs into the drilled recesses in the sides of the threaded work pieces.

Other objects and features of the invention will become apparent as the description proceeds, especially when taken in conjunction with the accompanying drawings, wherein:

Figure 1 is a fragmentary plan view of the apparatus.

Figure 2 is a fragmentary perspective view on the line 2—2, Figure 3.

Figure 3 is a fragmentary elevational view with parts broken away of the apparatus.

Figure 4 is a sectional view on the line 4—4, Figure 3.

Figure 5 is a sectional view on the line 5—5, Figure 3.

Figure 6 is a sectional view on the line 6—6, Figure 3.

Figure 7 is a sectional view on the line 7—7, Figure 3.

Figure 8 is a fragmentary sectional view on the line 8—8, Figure 1.

Figure 9 is a fragmentary sectional view taken on the line 9—9, Figure 1.

Figure 10 is a fragmentary view taken on the line 10—10, Figure 1.

Figure 11 is an enlarged sectional view on the line 11—11, Figure 1.

Figure 12 is an elevational view of a work piece as modified by the apparatus disclosed herein.

Figure 13 is an enlarged sectional view showing the operating relationship between the cutter, the punch, the plug guide passage, and the recess in the part.

Figure 14 is a fragmentary elevation showing the adaption of the apparatus for cutting slots in the work piece.

Figure 15 is a fragmentary perspective view of plastic material of D-cross-section suitable for use with the mechanism shown in Figure 14.

Figure 16 is a perspective view of a guide having an elongated opening therein for association with a laterally movable end mill type cutter.

Figure 17 is a fragmentary enlarged sectional view of mechanism at the drilling station for location of previously drilled hardened screws for subsequent insertion of the plastic member.

In accordance with the present invention, a threaded work piece such for example as a screw or bolt 10, seen in Figure 12, has a shallow recess 12 machined into one side thereof, intercepting one or more threads at the side of the work piece. Into this recess is inserted a plug 14 of a suitable plastic material, such for example as nylon.

The plastic plug serves as a friction lock which retains the screw or bolt against loosening. It serves an additional function in that it prevents leakage past the screw when tightened. This is because the plastic plug intercepts at least a complete thread space on the screw and serves as a dam which prevents leakage around the thread convolutions.

Referring now to Figure 1, the apparatus for producing the modified threaded member 10 comprises a stationary platform 20 upon which is mounted for index rotation a rotary work table 22. Mounted on the rotary work table are a plurality of work gripping clamps each comprising a stationary clamp member 24 and a rotary or movable clamp member 26 mounted for oscillation about the axis of a pivot mounting member 28. Interposed between the stationary clamp members 24 and the movable clamp members 26 are compression springs 30 operable to urge the clamping portions of the clamp members toward each other. In other words, while cam means later to be described are provided for releasing the clamps, the clamping action is effected by operation of the compression springs 30. The clamp members 24 and 26 are provided with removable and replaceable work engaging jaws 32 to permit quick changeover of the machine from one work piece to another.

In order to effect release of the work piece at the appropriate station on the machine there is provided a stationary cam 34 and each of the movable clamp members 26 is provided with a depending pin 36 which extends downwardly through an enlarged opening 37 in the table 22 and is provided with a roller 38 engageable with the cam 34 to release a work piece clamped between the jaws 32. In Figure 1 the jaws are shown in released position at the lower left and at the lower positions in the figure. Mounted on the platform 20 is a flat work stop 39. The operator may insert the screw between the jaws 32 above the work stop 39. Thereafter, during the next index advance of the table 22, the jaws 32 move to clamp the screw firmly in position before it moves over the top flat surface of the stop 39. Mounted on the stationary platform 20 is a drill guide 40 having a drill bushing 42 adapted to receive the drill bit 44 which is advanced to the left, as seen in the figure, into engagement with a work piece between the jaws 32 of the clamping members to drill the shallow recess in the work piece.

During subsequent index rotation the drilled piece is advanced into a station adjacent a brush 46 which may be a wire brush adapted particularly to remove burrs from the edge of the drilled recess in the work piece.

The next index rotation of the table 22 advances the work piece into proximity to an air jet nozzle 48 adapted to have a blast of air directed toward the drilled recess to insure that it is prepared for reception of the cut plastic plug.

The subsequent index rotation of the table 22 advances the drilled, brushed and cleaned work piece into proximity to mechanism for applying the plastic plug thereto. This mechanism is shown in its entirety at 50 and will subsequently be described in detail. For the present it is sufficient to note that plastic tape is advanced in a step by step manner, a cylindrical plug is cut from the tape and this plug is pressed firmly into the drilled recess at the side of the screw. Preferably, the plastic plug is cut slightly oversize with reference to the hole, as for example on the order of about .004 inch diameter. A punch advances the cut plug through a tapered passage and into the drilled recess. The tapered passage through which the cut plug advances is slightly smaller than the drilled hole in the work piece. The punch which advances the plug in the recess in the work piece applies substantial pressure thereto and re-expands the plug in the recess causing it to be firmly locked and retained therein.

Thereafter, upon the next index rotation of the table 22, the movable clamp 26 is moved to release position and the finished screw drops out. If desired, an inclined stripper may be positioned to engage the screw when it is released to effect positive mechanical movement of the screw out of the space between the jaws.

The subsequent index rotation of the table 22 brings the open jaws in position over the stop 39, at which station the operator inserts a new work piece.

Thus, at each index rotation of the table the only duty of the operator is to insert a new screw into the space between the jaws 32 and of course this operation may be rendered automatic if desired by available types of automatic feeding devices. At each index rotation of the table a finished screw is ejected from the machine.

Referring now to Figure 2 there is illustrated at 51 a portion of the single motor which is employed to power the entire mechanism. The motor 51 is connected as by a drive belt 52 to the sheave 54 of a speed reducer 56 which is adapted to drive the vertically extending cam shaft 58 shown as connected to the drive sleeve 60 of the speed reducer by a shear pin 62. The cam shaft 58 is provided with a plurality of cams and devices which will now be described.

In order to effect index rotation of the table 22, the table is secured to a shaft 64 carrying the plate 66 forming a part of a Geneva drive mechanism. The plate 66, as best seen in Figure 7, is provided with a plurality of radially extending slots 68 which are adapted to be engaged successively by a drive roller 70 carried by an arm 72 keyed or otherwise secured to the cam shaft 58. Thus, upon each complete rotation of the cam shaft 58, the shaft 64 and rotary table 22 are advanced through an arc of 60 degrees.

It is essential that during the drilling operation and the step of applying the plastic plug to the drilled recess, the table 22 shall remain in properly located indexed and locked position. In order to accomplish this the mechanism illustrated in Figures 5, 8 and 10 is provided. The stationary platform 20 has secured to the underside thereof a block 76 carrying a pivot support 77 for an index lock arm 78. At one end the arm 78 is provided with a spring seat 80 having a locator 81 thereon and between the spring seat 80 and a locating recess 82 there is provided a compression spring 84. At its opposite end the arm 78 includes a cylindrically formed head 86 which is received in a slot 88 provided at the lower end of an index table locating pin 90. The pin is vertically movable in a bushing 92 provided in an opening in the stationary platform 20 and the upper end of the pin is receivable in one of a plurality of locating bushings 94.

Carried by the arm 78 intermediate its pivot mounting 77 and its spring seat 80 is a roller 96 engageable by an arcuate cam 98. As best seen in Figure 5, the cam shaft 58 rotates clockwise and the cam 98 includes a camming portion 99 adapted to lift the roller 96 and accordingly to rotate the arm 78 in a counter-clockwise direction, as seen in Figure 8. This has the effect of lowering or retracting the locator pin 90 to free the table 22 for its index rotation. The cam 98 includes a downwardly inclined portion 100 which during rotation of the cam passes beneath the roller 96 and permits it to move downwardly gradually under the influence of the spring 84 so as to move the locating pin 90 upwardly into suitable locating engagement with a locator bushing 94. As best seen in Figure 8, the upper end of the pin 90 is tapered to assist its entry into the guide bushing 94. It will further be observed that if for any reason the pin fails to enter the guide bushing, no damage is done to the mechanism, since upward movement of the pin 90 is effected solely by the action of the compression spring 84.

There has so far been described mechanism effective to provide continuous rotation of the cam shaft, Geneva mechanism to provide intermittent index rotation of the work supporting table 22, locator mechanism including the pin 90 for insuring accurate location of the table 22 during its intervals of rest, and work clamping mechanism effective to clamp and release a work piece for for operation thereon by mechanism now to be described.

The first operation which takes place upon a work piece after it advances from the loading station to the drilling station is to have a shallow cylindrical recess drilled at one side thereof. The mechanism for effecting this drilling operation is best seen in Figures 3, 5 and 7. The frame of the machine includes a vertically extending shaft 102 having collars 104 and 106 fixed thereto between which is located a collar 108 which is rotatable on the shaft 102. Rigidly affixed to the collar 108 is an arm 110 having a roller 112 engageable with a drill actuating cam 114. Mounted on a ledge 116 of the frame are trunnion bearings 118 supporting a shaft 120 to which is affixed a bell crank 122 having a relatively short arm 124 and a longer arm 126. A link 128 is pivoted at one end as indicated at 130 to the arm 110 and at its other end, as indicated at 132, to the short arm 124 of the bell crank.

As best seen in Figure 3, a mounting bracket 134 is secured to the side of the frame and includes a drill support 136 in which the drill 138 is slidable. The drill 138 may include a drive motor of standard construction which may be energized continuously. The drill 138 includes an elongated portion 140 slidable in the support 136 and provided at its underside with rack teeth 142 meshed with the teeth of a pinion 144. The pinion 144 is secured to a shaft 146 to which is clamped an operating arm 148 having a pivot pin 150 extending between ears 152 and the other end thereof. The pin 150 has a threaded aperture extending therethrough for the reception of an adjustable screw 154, the screw having a reduced unthreaded end portion 156 slidable in a bushing 158 secured to a link 160 which is pivotally connected to the arm 126 by pivot member 162. Extending between a bracket 164 on the frame and an opening 166 on the arm 148 is a tension spring 168 which urges the arm 148 in a clockwise direction, as seen in Figure 3, and hence urges the drill 138 to the right or toward retracted position. Accordingly, once during each rotation of the cam 58, the drill 138 is moved radially of the table 22 and drills a shallow recess in the side of the screw or other work piece. During this operation the drill bit 44 is steadied by engagement with the drill guide bushing 42. Quick and accurate adjustment of the depth to which the recess is drilled may be accomplished by adjustment of the screw 154.

After a particular work piece has been drilled at the drilling station, the next successive index rotation of the table 22 moves it to the station adjacent the brush 46. The brush 46 may be driven by its own motor (not shown) and will normally be in continuous rotation.

The next successive rotation of the table 22 brings the particular work piece under consideration to a position adjacent the nozzle 48 at which time a blast of compressed air is directed against it and particularly into the drilled recess. The air jet is controlled by a valve 170 having a movable control element 172 engageable by the end of the Geneva actuating crank arm 72 during its rotation, the relationship of the parts being best illustrated in Figure 7. The air valve 170 is suitably connected to the nozzle 48 by air lines, portions of which are seen at 174 in Figure 6.

*Plastic applicator mechanism*

The mechanism for applying plastic to the drilled recess is designated 50 in Figure 1 and details of this mechanism are seen in Figures 3, 5, 6, 7, 9, 10 and 11. Referring first to Figure 11, the stationary platform 20 has secured thereon a mounting block 180 carrying ratchet feed mechanism indicated generally at 182, plastic cutting mechanism indicated generally at 184, and plastic punch mechanism indicated generally at 186.

Referring first to the ratched feed mechanism for advancing the plastic, there is provided a roller 188 having a shallow peripheral V-shaped groove 190. Associated with the roller 188 is a knurled feed roller 192 carried by an arm 194 pivoted as indicated at 196 to an extension 198 of the mounting post 200. The post 200 is provided with a pin 202 extending through an opening 204 in a cross portion 206 of the arm 194. A compression spring 208 is provided which surrounds the pin 202, engages the underside of the cross portion 206 and rest upon a horizontal portion of the post 200. The spring 208 accordingly biases the knurled roller 192 toward the grooved roller 188 into engagement with a continuous strip or ribbon plastic material indicated at P. The foregoing construction permits the arm 194 to be rocked in a position to permit ready insertion of the plastic strip P and to advance it into proper operating position.

In order to effect the proper step by step advance of the plastic material, there is provided actuating mechanism comprising meshed pinions 210 and 212 fixed respectively to shafts carrying the rollers 188 and 192. Associated with the shaft 214 carrying the pinion 210 and the roller 188 is a one-way clutch 216. An arm 218 oscillated by mechanism later to be described, extends to the clutch 216 which is effective only during clockwise rotation of the arm 218 as seen in Figure 9, to transmit the rotation thereof to the shaft 214. Accordingly, as the arm 218 is oscillated the plastic material P is advanced in predetermined increments.

The mechanism for effecting predetermined oscillation of the actuating arm 218 comprises an arm 220 fixedly secured to a collar 222 interposed between collars 224 and 226 carried by the vertical shaft 102 as best seen in Figures 3 and 5. The arm 220 carries a cam engaging roller 228 which engages the periphery of the plastic feed cam 230 having a gradual rise followed by an abrupt fall portion indicated at 232. Pivoted intermediate the ends of the arm 220 is a link 234 which extends through an opening 236 in the frame and at its opposite ends is pivotally connected to a lever 238 mounted on a bracket 240. The upper end of the lever 238 is pivotally connected to a link 242 which extends to the actuating arm 218. The bracket 240 includes a post portion 244 carrying an abutment screw 246 adapted to engage an abutment 248 on the lever 238 so as to limit movement of the lever 238 and accordingly to adjust the amount of plastic which is advanced during each oscillation of the arm 218.

The mechanism indicated generally at 184 for cutting cylindrical plugs or discs of the plastic material includes a generally tubular cutter 250, the forward end of which is tapered as indicated at 252 and which terminates in a sharp circular cutting edge. The cutter 250 is slidably received in a bushing 254 which at its forward end receives a guide member 256 having an opening 258 therethrough of a size to receive the cut plug or disc of plastic material as it is advanced therethrough. In Figure 11 the guide member 256 is shown with the passage 258 terminating at an appreciable distance from the recess in the work piece 10. However, by appropriately recessing the work engaging jaws 32, it will be understood that the spacing between the discharge end of the passage 258 and the recess in the work piece may be reduced to any desired amount. A tube 259 is provided to receive the scrap plastic strip P after the plugs have been cut therefrom. The cutter 250 is threaded and received thereon is a drive element 260 in the form of an adjustable nut having collars 262 between which extends ears provided at the upper end of the cutter drive lever 264. The lever 264 is pivoted to the block 180 by a pin 266 and its lower end is connected by a link 268 to a lever 270 mounted for rotation on a second vertically extending shaft 272 which is similar to the shaft 102. The lever 270 is provided with a roller 274 at its free end which engages the periphery of a cam 276 fixedly secured to the cam shaft 58. A tension spring 278 extends between the lever 270 and a spring eye 280 carried by the frame and maintains the roller 274 in contact with the periphery of the cam 276.

In order to advance the cut disc or plug of plastic material into the recess formed in the work piece 10, punch mechanism indicated generally at 186 is provided. This mechanism includes an elongated punch 282 having its outer end engaged by the reduced inner end of an adjustable abutment screw 283 having a knurled head 284. The screw 283 is adjustably received in the threaded portion 285 of the punch slide 286. A lock nut 287 is provided which insures retention of the adjustment of the punch 282. A set screw 290 engages the outer end of the punch 282 and supports it, although the forces developed in pressing the plastic plug into the recess of the work piece are of course taken up by the abutment screw 283. The punch slide 286 is longitudinally slidable in a bushing 292 received in an opening in the block 180.

The punch slide 286 is pivotally connected to the upper end of lever 294 by pivot means indicated at 295. The lever 294 is pivoted to a bracket 297 carried by the frame of the machine. Pivotally connected to the lower end of the lever 294 is a link 298 the other end of which is pivotally connected to a lever 300 which in turn is pivoted to the shaft 272. At its free end the lever 300 is provided with a roller indicated at 302 which engages the peripheral surface of the cam 304.

Referring to Figure 6, it will be observed that upon clockwise rotation of the cam shaft 58 the cam 276 actuating the cutter engages the cam following roller 274 in advance of engagement between the punch actuating cam 304 and its cam following roller 302. Accordingly, the sequence of operation is a forward movement of the cutter 250 in its cutting stroke followed by forward advance of the punch 282 to advance the cut disc or plug into position within the recess formed in the work piece 10. Correspondingly, the cams are arranged to provide for rearward movement of the cutter before rearward movement of the punch.

Referring now to Figure 13, there is shown a fragmentary sectional enlargement of the forward end of the cutter 250, the forward end of the punch 282, the guide passage 258, and the drilled recess shown at 12 in a side of the work piece 10. From this figure it will be apparent that the passage 258 includes a tapered portion adapted to exert a compressing effect on the cut disc or plug 14. The internal diameter of the cutter 250 is somewhat larger than the internal diameter of the drilled recess 12. The entrance end of the tapered passage 258 is large enough to receive the cut plug 14 and the taper of the passage is such that the diameter of the cut plug or disc is reduced to a dimension slightly less than the internal diameter of the recess 12.

The punch 282 is smaller than the smallest diameter of the tapered passage 258. In a typical example the punch may be designed to cut the plug 14 oversize by approximately .004 inch with respect to the recess 12. The tapered guide passage 258 is dimensioned to reduce the outside diameter of the plug 14 to a dimension approximately .001 inch less than the internal diameter of the recess 12. The forward end of the punch 282 is smaller by a few thousandths of an inch than the smallest diameter of the tapered guide passage 258.

It is a property of a plastic material suitable for use in the present machine, such as nylon plastic, that while it exhibits the property of plasticity, it tends to regain initial shapes and dimensions. Accordingly, when the plug 14 is initially cut oversize with respect to the recess 12 by a few thousandths of an inch, it tends to regain its initial cut size after it emerges from the tapered guide passage 258. The tendency of this cut plastic plug to expand radially is substantially assisted by the force applied thereto by the relatively smaller end of the punch 282. Accordingly, the cut plastic plug fills the drilled recess 12 completely and is firmly frictionally interlocked therewith to a degree which effectively prevents accidental dislodgment.

The foregoing constitutes a complete description of a preferred embodiment of the present invention. However, certain modifications and variations are contemplated.

In the first place, the foregoing disclosure was limited to the drilling of a cylindrical cross-section recess and the insertion of a disc of plastic.

Referring to Figures 14 and 15 there is suggested a simple variation by means of which elongated plastic elements may be inserted. Thus, in Figure 14, a work piece in the form of a screw 300 is shown as gripped between jaws 302. In this case instead of the drill 44 previously described, a slotting cutter 304 is provided having a cutting blade 306 adapted to form an elongated slot of fragmentary circular cross-section such for example as a Woodruff keyway.

If an elongated slot is formed in the screw as suggested in Figure 14, it will then be necessary to provide a different form of nylon or plastic. As seen in Figure 15, a continuous strip of plastic 310 is provided of generally D-shape in cross-section so that transverse slices from this strip provide plugs adapted to conform to the slot cut by the cutter 304.

In this case it will of course be appreciated that the mechanism for advancing the nylon member moved so that the nylon is fed horizontally rather than vertically. In addition, it will of course be necessary to conform the shape of the cutter, plunger and guide to conform to the shape of the plastic. In this case the D-shaped section of plastic will be advanced through a guideway corresponding to the guideway 258 shown in Figure 13, which narrows laterally so that the D-shaped plastic plug is laterally compressed as it is inserted into the slot.

Referring now to Figure 16, a somewhat different variation is suggested. In this figure there is shown at 320 a bracket having an upstanding post 322 provided with a vertically elongated guide opening 324 therein. This guide opening is adapted to be associated with an end mill type cutter which is movable longitudinally into the guide opening in the same manner as the drill shown in the first embodiment of the invention. In this case however, the apparatus includes mechanism for effecting vertical transverse movement of the end mill type cutter after it has been fed to depth to provide a vertically elongated slot. In this case it will of course be appreciated that the corresponding necessary changes will have to be made in feeding, cutting and applying the plastic plug to conform to the vertically elongated recess.

The present apparatus also lends itself admirably to an operation in which the plastic plug is inserted in a recess in a hardened screw.

It is of course impractical to form the recess or slot in a screw after the same has been hardened. In accordance with the present invention however, the screw may have the recess or slot formed in its side prior to hardening. This may be accomplished by employing the apparatus disclosed herein in which the nylon plug cutting and applying station is completely omitted or is rendered inactive. After the screws have been provided with the recess in the side thereof, they are hardened in any usual or convenient manner. Thereafter, they are brought back to the apparatus disclosed herein. At this time however, instead of providing a drill or other cutting tool at the usual drilling station, the drill 44 is removed from the chuck of the drill support and a bullnose locating probe 330 substituted therefor. In this operation the drill motor of course will not be energized. The drilled or slotted and hardened screw indicated at 132 is located in a position of approximate alignment between the jaws herein designated 334 and 336. These jaws, as it will be recalled, are spring biased toward clamping position and for this operation the springs providing the bias are sufficiently weak to permit rotation of the screw 332 therein. It is thus only necessary for the operator to position the screw in the open jaws with the drilled recess or slot 338 in approximately correct position. Thereafter, as the work piece is advanced to the drilling station, the bullnose probe 330 is advanced into position and will rotate the work piece 332 to the exact required angular position. Thereafter, the machine continues to operate as before and when the properly located recess 338 reaches the plug applying station the plug is cut and applied in the usual manner.

While in the foregoing several different types of cutting operations have been suggested as available for providing the recess for receiving the cut nylon plug, the present apparatus makes it possible to provide the recess in a series of operations if desired. This is because in the present apparatus the tool guide is mounted in a stationary position adjacent the path of travel of the work piece. Accordingly, if desired, the recess or slot may be provided in a series of operations such for example as a rough cutting and a final cutting operation; or a rough cutting and final grinding operation; or a rough cutting, fine cutting, and final grinding operation if desired. In each operation the particular tool performing the operation is associated with a guide capable of functioning therewith. This of course would not be possible if the tool guide were mounted on the rotary table to remain in associated position with the particular work piece. In such case, if the opening in the guide were of the proper dimension to cooperate properly with the finished cutting tool, it would be too large for the rough cutting tool.

A second very important advantage which results from providing the guide means in stationary position adjacent the path of advance of the work piece is the possibility of compressing the plastic or nylon plug as it is inserted into the recess. This not only affords the possibility of insuring secure reception of the plug in the recess, due to subsequent expansion, but it also reduces the requirement for absolute accuracy in the location of the work piece at the plug applying station. Thus, for example, in the typical application in which a cylindrical recess is drilled and a plastic disc is inserted, the disc may be compressed radially so that it is definitely undersize with respect to the cylindrical recess in the screw. The amount by which the plastic plug is undersize is a measure of the permissible error in locating the work piece at the plug applying station.

It will be observed that the present machine is quickly adjustable and adaptable to provide different sizes of plugs in different work pieces. Accordingly, it is particularly well adapted for short runs and permits quick changeover. The machine as illustrated operates fully automatically, requiring only the attention of an operator to place pieces between the clamping members at the loading station. As previously indicated, it is within the contemplation of the present invention to provide automatic means of conventional type for advancing work pieces to the machine at the loading station, in which case the machine will be fully automatic.

Inasmuch as a single motor is employed to effect all of the relative motions of the parts of the machine (disregarding of course rotation of the drill and of the brush), timing of the relative motions is extremely simple and foolproof.

The machine is quite rapid in operation, the cycling being extremely rapid, and the only working interval of substantial duration being that required to drill the recess to required depth.

While the invention is illustrated as applying a cut plastic plug to a recess at the side of a threaded part, it will be appreciated that the cut plastic plug could be applied to other parts of other articles, such for example as to the end of a threaded part.

The drawings and the foregoing specification constitute a description of the improved apparatus for applying locking plugs of plastic material to threaded articles in such full, clear, concise and exact terms as to enable any person skilled in the art to practice the invention, the scope of which is indicated by the appended claims.

What we claim as our invention is:

1. Mechanism for applying solid plastic plugs to threaded work pieces comprising, a stationary frame, a rotary work table on said frame, a work clamp on said table, means for effecting index rotation of said table to position a work piece held by said clamp successively at a plurality of stations, a recessing tool at one station movable radially toward and away from said table to provide a radial recess of a predetermined diameter in the work piece at said one station, a plug inserting device at another station comprising a tubular cutter mounted on said frame, said cutter having a cutting diameter slightly larger than the diameter of said recess to cut a circular solid plug from a strip of plastic material, said plug having a diameter somewhat greater than the diameter of the aforesaid recess, a guide on said frame independent of said work clamp for guiding said plug into said recess, said guide including a tapered guide passage which has its smallest end directly opposite said radial recess, the smallest end of said guide passage having a diameter lightly smaller than the diameter of said recess and being shaped to compress the solid plastic plug to a diameter smaller than the diameter of said recess, a plunger coaxially mounted in the interior of said cutter, the leading end of said plunger having a diameter slightly smaller than the diameter of the smallest end of said guide passage, both said cutter and said plunger being movable radially toward and away from the work piece at said last-mentioned station, means for feeding in predetermined increments the strip of plastic material in a direction across the path of said cutter, means for moving the cutter in its cutting stroke to cut a cylindrical solid plug from said plastic material, and means operable after advancement of said cutter for moving said plunger forwardly in timed sequence to the operation of said cutter to force the solid plug through said guide passage so as to compress the solid plug to a diameter less than the diameter of the recess and then insert the compressed plug into said recess, said last means being effective to apply pressure against the outer end of said plug after it has seated in said recess to assist in radial expansion of said plug.

2. An automatic cam actuated machine for applying solid plastic plugs to threaded work pieces comprising a stationary frame, a vertical shaft rotatably mounted in said frame, a rotary work supporting table secured to said vertical shaft, a work clamp on said table, a cam shaft rotatably carried by said frame, drive means for driving said cam shaft, means responsive to the rotation of said cam shaft for effecting intermittent index rotation of said vertical shaft and said work supporting table to position a work piece held by said clamp successively at a plurality of stations, said last-mentioned means comprising Geneva drive mechanism interposed between said shafts including a driver connected to said cam shaft, a recessing tool at one station movable toward and away from said table to provide a radial recess in the work piece, a recessing tool guide on said frame for guiding said tool, a recessing feed cam on said cam shaft, cam follower mechanism between said recessing tool and said recessing feed cam for controlling the feed of said recessing tool toward the work piece at said one station, and a plug inserting device at another station comprising a cutter mounted on said frame, a plunger having a plug engaging portion rearwardly of said cutter, both said cutter and plunger being movable radially toward and away from the work piece at said last-mentioned station, means for feeding in predetermined increments a strip of plastic material in a direction transversely of and at one side of said work piece across the path of said cutter, a plug guide on said frame independent of said work clamp and said tool guide for guiding said plug into said recess, said plug guide including a tapered guide passage, the smallest end of said guide passage being directly opposite said radial recess and in alignment with the recess and shaped to laterally compress the plug to a width which is slightly smaller than the width of said recess, a plug cutting cam on said cam shaft, and a pressing cam on said cam shaft, said plug cutting cam being adapted for moving the cutter in its cutting stroke to cut a solid plug of plastic from said plastic material and said pressing cam operable after advancement of said cutter for moving said plunger forwardly in timed sequence to the operation of said cutter to force the plug through said guide passage so as to laterally compress the solid plug to a width which is slightly smaller than the width of said recess and then insert the compressed plug into said recess, said pressing cam being effective to apply pressure through the plug engaging portion of said plunger against the outer end of said plug after it has seated in said recess to assist in radial expansion of said plug in said recess.

3. An automatic machine comprising a stationary frame, a rotary work table on said frame, movable clamping jaws on said table, means for rotating said table in steps to advance work pieces held by the jaws thereon to a series of stations, a loading station at which said jaws are separated, a drilling station comprising a drill movable radially of the table to drill a radial recess of circular cross-section in a work piece held by said jaws at said drilling station, means for closing said jaws during movement from said loading station to said drilling station, a plugging station, means at said plugging station for cutting a solid circular plug from a strip of plastic material and pressing the solid plug into the drilled recess in the work piece held by the jaws at said plugging station, said last-mentioned means comprising a tubular cutter mounted on said frame, said cutter having a diameter slightly larger than the diameter of said recess and adapted to cut a plug to a diameter somewhat greater than the diameter of said recess, a plunger coaxially mounted in the interior of said cutter, both said cutter and plunger being movable radially toward and away from the work piece at said plugging station, a guide on said frame independent of said clamping jaws for guiding said plug into said recess, said guide including a tapered guide passage in alignment with the recess, the smallest end of said guide passage having a diameter slightly smaller than the diameter of said recess and being shaped to compress the solid plastic plug to a diameter slightly smaller than the diameter of said recess, means for feeding in predetermined increments the strip of plastic material in a direction across the path of said cutter, means for moving the cutter in its cutting stroke to cut a cylindrical plug from said plastic material, means operable after the advancement of said cutter for moving said plunger forwardly in timed sequence to the operation of said cutter to force the plug through said guide passage so as to compress the plug to a diameter less than the diameter of said recess and then insert the compressed plug into said recess, a discharge station at which said jaws are opened, and cam means for opening said jaws during movement from said plugging station to said discharge station.

4. Mechanism for applying solid plastic plugs to threaded work pieces comprising, a stationary frame, a rotary work table on said frame, a work clamp on said table for holding a work piece having a radial recess of a predetermined diameter, means for effecting index rotation of said table to position the work piece held by said clamp at a plugging station, a plug inserting device at said plugging station comprising a tubular cutter mounted on said frame, said cutter having a cutting diameter slightly larger than the diameter of said recess to cut a circular solid plug from a strip of plastic material, said plug having a diameter somewhat greater than the diameter of the aforesaid recess, a guide on said frame independent of said work clamp for guiding said plug into said recess, said guide including a tapered guide passage which has its smallest end directly opposite said radial recess, the smallest end of said guide passage having a diameter slightly smaller than the diameter of said recess and being shaped to compress the solid plastic plug to a diameter smaller than the diameter of said recess, a plunger coaxially mounted in the interior of said cutter, the leading end of said plunger having a diameter slightly smaller than the diameter of the smallest end of said guide passage, both said cutter and said plunger being movable radially toward and away from the work piece at said plugging station, means for feeding in predetermined increments the strip of plastic material in a direction across the path of said cutter, means for moving the cutter in its cutting stroke to cut a cylindrical solid plug from said plastic material, and means operable after advancement of said cutter for moving said plunger forwardly in timed sequence to the operation of said cutter to force the solid plug through said guide passage so as to compress the solid plug to a diameter less than the diameter of the recess and then insert the compressed plug into said recess, said last means being effective to apply pressure against the outer end of said plug after it has seated in said recess to assist in radial expansion of said plug.

References Cited in the file of this patent

UNITED STATES PATENTS

| Number | Name | Date |
|---|---|---|
| 990,405 | Stimpson | Apr. 25, 1911 |
| 1,498,879 | Lofland | June 24, 1924 |
| 1,720,033 | Caulkins | July 9, 1929 |
| 1,803,491 | Thiry | May 5, 1931 |
| 2,012,716 | Colchensky | Aug. 27, 1935 |
| 2,031,797 | Tarbox | Feb. 25, 1936 |
| 2,086,684 | Taylor | July 13, 1937 |
| 2,090,949 | Richards | Aug. 24, 1937 |
| 2,208,584 | Jeffords | July 23, 1940 |
| 2,405,367 | Nichols | Aug. 6, 1946 |
| 2,520,121 | Brutus | Aug. 29, 1950 |
| 2,636,194 | Schneider | Apr. 28, 1953 |
| 2,643,403 | McBlane | June 30, 1953 |
| 2,668,966 | Corlett | Feb. 16, 1954 |
| 2,740,973 | Borner | Apr. 10, 1956 |
| 2,796,906 | Buckley | June 25, 1957 |
| 2,810,438 | Stone | Oct. 22, 1957 |